United States Patent
Yong et al.

(10) Patent No.: US 9,230,592 B1
(45) Date of Patent: Jan. 5, 2016

(54) ELECTRONIC SYSTEM WITH A METHOD OF MOTOR SPINDLE BANDWIDTH ESTIMATION AND CALIBRATION THEREOF

(71) Applicant: Western Digital Technologies, Inc., Irvine, CA (US)

(72) Inventors: Zhou Yong, Ningbo (CN); Jie Wan, Singapore (SG); Shuyu Cao, Singapore (SG); Jianghong Ding, Ladera Ranch, CA (US); Jern Khang Tan, Muar (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/582,123

(22) Filed: Dec. 23, 2014

(51) Int. Cl.
  *G11B 15/46* (2006.01)
  *G11B 19/04* (2006.01)

(52) U.S. Cl.
  CPC .................................. *G11B 19/048* (2013.01)

(58) Field of Classification Search
  None
  See application file for complete search history.

(56) References Cited

U.S. PATENT DOCUMENTS

| | | |
|---|---|---|
| 5,170,386 A | 12/1992 | Tateishi |
| 5,365,385 A | 11/1994 | Hargarten et al. |
| 5,404,255 A | 4/1995 | Kobayashi et al. |
| 5,432,766 A | 7/1995 | Ando et al. |
| 5,471,353 A | 11/1995 | Codilian et al. |
| 5,473,230 A | 12/1995 | Dunn et al. |
| 5,847,895 A | 12/1998 | Romano et al. |
| 5,898,283 A | 4/1999 | Bennett |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |

(Continued)

FOREIGN PATENT DOCUMENTS

WO  2004057583  7/2004

OTHER PUBLICATIONS

US 7,205,739, Mar. 13, 2015, (withdrawn).

(Continued)

*Primary Examiner* — K. Wong (57) ABSTRACT

An apparatus includes: a disk; a spindle motor configured to rotate the disk; and control circuitry with a spindle motor control loop, coupled to the spindle motor, the control circuitry configured to: inject a bandwidth test frequency into the spindle motor control loop, measure an open loop gain of the spindle motor control loop, calculate, using coordinate transformations, an estimated loop bandwidth of the spindle motor control loop based at least on one iteration of the bandwidth test frequency injection and the open loop gain measurement, and generate optimum loop parameters of the spindle motor control loop.

20 Claims, 4 Drawing Sheets

(56) References Cited

U.S. PATENT DOCUMENTS

| | | |
|---|---|---|
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,744,587 B2 | 6/2004 | Ang et al. |
| 6,747,837 B1 | 6/2004 | Bennett |
| 6,753,667 B2 | 6/2004 | Sakamoto |
| 6,760,186 B1 | 7/2004 | Codilian et al. |
| 6,788,483 B1 | 9/2004 | Ferris et al. |
| 6,791,782 B1 * | 9/2004 | Codilian et al. ........... 360/73.03 |
| 6,791,785 B1 | 9/2004 | Messenger et al. |
| 6,795,268 B1 | 9/2004 | Ryan |
| 6,819,518 B1 | 11/2004 | Melkote et al. |
| 6,825,622 B1 | 11/2004 | Ryan et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,463 B2 | 11/2005 | Sri-Jayantha et al. |
| 6,963,465 B1 | 11/2005 | Melkote et al. |
| 6,965,488 B1 | 11/2005 | Bennett |
| 6,965,547 B2 | 11/2005 | Kadlec et al. |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,019,482 B2 | 3/2006 | Yoneda |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,136,248 B2 | 11/2006 | Tanner |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,564 B2 | 8/2007 | MacKay |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | |
|---|---|---|
| 7,391,584 B1 | 6/2008 | Sheh et al. |
| 7,432,673 B2 | 10/2008 | Oh et al. |
| 7,433,143 B1 | 10/2008 | Ying et al. |
| 7,440,210 B1 | 10/2008 | Lee |
| 7,440,225 B1 | 10/2008 | Chen et al. |
| 7,443,628 B2 | 10/2008 | Oyabu |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,471,483 B1 | 12/2008 | Ferris et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,129 B2 | 10/2009 | Shirai et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,990,089 B1 | 8/2011 | Ying et al. |
| 8,000,053 B1 | 8/2011 | Anderson |
| 8,031,423 B1 | 10/2011 | Tsai et al. |
| 8,044,616 B1 | 10/2011 | Krishnamoorthy et al. |
| 8,049,985 B2 | 11/2011 | Zhu et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,094,405 B1 | 1/2012 | Ying et al. |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B2 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |

(56) References Cited

U.S. PATENT DOCUMENTS

| | | |
|---|---|---|
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,922,940 B1 * | 12/2014 | Ferris .................. 360/75 |
| 2002/0110057 A1 | 8/2002 | Kadlec et al. |
| 2003/0184249 A1 | 10/2003 | Heydt et al. |
| 2004/0013056 A1 | 1/2004 | Ando |
| 2004/0125494 A1 | 7/2004 | Hara et al. |
| 2004/0160865 A1 | 8/2004 | Storz |
| 2004/0190397 A1 | 9/2004 | Kuwahara et al. |
| 2004/0246618 A1 | 12/2004 | Ehrlich |
| 2004/0246833 A1 | 12/2004 | Ehrlich |
| 2008/0042602 A1 | 2/2008 | Kumar |
| 2010/0035085 A1 | 2/2010 | Jung et al. |
| 2010/0195243 A1 | 8/2010 | Zhu et al. |
| 2011/0235206 A1 | 9/2011 | Chung |
| 2012/0224464 A1 | 9/2012 | Kim |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Michael T. Nicholls, et al., U.S. Appl. No. 14/287,511, filed May 24, 2014, 19 pages.

A. Kechich et al., "Application of nonlinear Sliding-Mode control to Permanent Magnet Synchronous Machine," International Journal of Applied Eng. Research, ISSN 0973-4562, vol. 2, No. 1, Apr. 2007, pp. 125-138.

* cited by examiner

ELECTRONIC SYSTEM WITH A METHOD OF MOTOR SPINDLE BANDWIDTH ESTIMATION AND CALIBRATION THEREOF

TECHNICAL FIELD

An embodiment relates generally to an electronic system, and more particularly to a system for actuator control.

BACKGROUND

Modern consumer and industrial electronic devices require storage of information, such as digital photographs, numeric data, electronic mail, calendar, or contacts. These devices can be electronic systems, such as notebook computers, desktop computers, digital video players, compact discs, servers, televisions, and projectors, and are providing increasing levels of functionality to support modern life. The need to access, store, read back, or any combination thereof of information on these devices quickly and reliably is vital for users or performance of systems having the devices.

Electronic devices having a rotational storage medium rotated about a central axis, connected to an electric motor and an adjacent head used to write or read back information on the rotational storage medium, are extremely sensitive to variations in rotational speed. The electric motor must be developed and designed to operate according to design specifications selected and targeted by the manufacturer to provide the users with quick and reliable access to the information to the users.

Manufacturers often use multiple supplier sources for the electric motor, resulting in specification variations between electric motors, and leading to unacceptable and inconsistent write or read back performance and reliability issues with the electronic devices. Thus, the manufacturers and designers of the electronic devices are constantly looking for ways to maintain consistent performance and reliability of their electronic devices.

Research and development in existing technologies can take a myriad of different directions and often resulting in trade-offs or metric sacrifices. One way to provide the consistent performance and reliability demanded by the consumer and industrial markets, is to require each of the different supplier sources to test and screen each and every one of the electric motors prior to shipment to the manufacturer for assembly. This is unacceptable as costs for the electric motors would increase and production of the electronic devices would be delayed and/or disrupted.

DETAILED DESCRIPTION

A need still remains for an electronic system with a simple, low cost, method of screening, determining, and generating customize adjustments to rotational motors used to rotate storage mediums while improving yield and performance when writing, reading, or accessing information on the storage medium. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

n the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

Figure 1A:
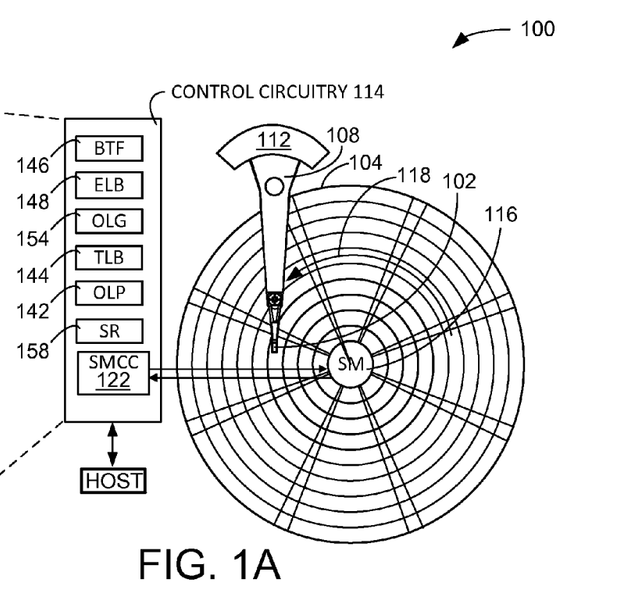
FIGS. 1A, 1B, and 1C show an operational diagram of an electronic system according to various embodiments.
Figure 1B:
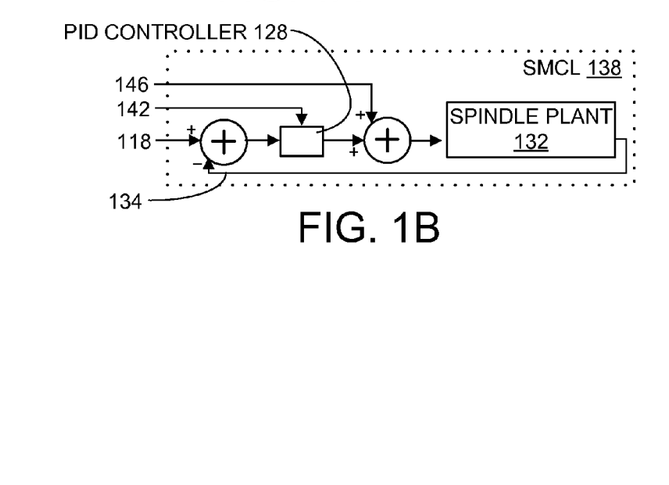
Figure 1C:
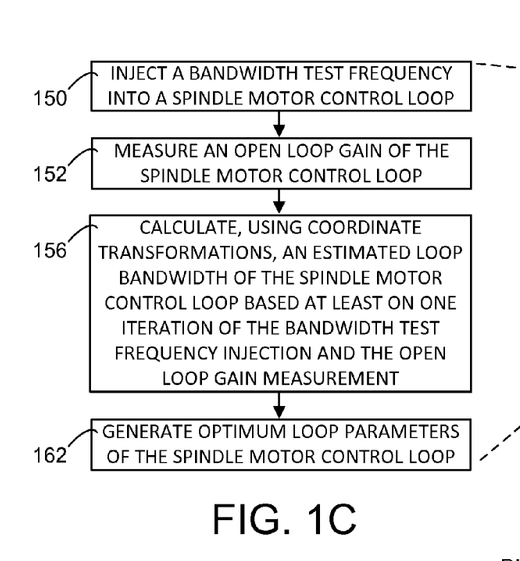

Referring now to FIGS. 1A, 1B, and 1C, therein are shown an operational diagram of an electronic system 100 according to various embodiments. The electronic system 100 can represent an apparatus for the various embodiments. An embodiment depicted in FIGS. 1A, 1B, and 1C is shown as a hard disk drive, as an example, although it is understood that the electronic system 100 of the various embodiments can be other storage devices using a rotating media and/or a rotating head such as a Compact Disk (CD) player, a Digital Video Disc (DVD) player, or a solid state hybrid drive.

Other embodiments may include a tape drive with a rotating head adjacent linear magnetic tape media driven rotated along a closed perimeter path, or similar devices with a rotating media, a rotating head, a tape media, or any combination thereof driven by at least one rotary motor. For further embodiments, the electronic system 100 can represent a desktop computer, a notebook computer, a server, a tablet, a television, a household appliance, or other electronic systems having the hard disk drive, one of the other storage devices, or any combination thereof.

In one embodiment, the electronic system 100 of FIG. 1A comprises a head 102 mounted to a flex arm attached to a primary-actuator 108. The head 102, suspended over a media 104, such as a disk, can be can include a write element, not shown (e.g., an inductive coil) and a read element, not shown (e.g., a magneto-resistive read element) of the head 102. The media 104 is a structure for storing information and can be made of non-magnetic material with top and bottom surfaces covered with magnetic material to form a coating layer capable of magnetization.

As an example, the media 104 can be a disk for one embodiment of the electronic system 100 as a rotating storage system, such as the hard disk drive (HDD). In another embodiment, the media 104 can be a linear magnetic tape strip (not shown) driven along a closed perimeter path for one embodiment of the electronic system 100 as a linear storage system, such as a tape drive having a rotating head (not shown) adjacent the linear magnetic tape strip and driven by a rotary motor.

The primary-actuator 108, attached to the flex arm attached with the head 102, can be rotated about in an arc across the media 104 to re-position the head 102 over various locations over the media 104. A head actuation motor (HAM) 112, such as voice coil motor assembly, a stepper motor assembly, or a combination thereof, can apply the torque or force for the re-repositioning and the arc movements of the primary-actuator 108.

The head 102 of FIG. 1A, the primary-actuator 108, and the HAM 112 are coupled to control circuitry 114. The control circuitry 114 can include digital circuitry, analog circuitry, one or more processors, memory devices, power supplies, one or more user interfaces, and a host interface coupled to another system, such as a host, a host computer, a host system, or a sub-system of a host.

A spindle motor 116, shown in FIG. 1A, is used to rotate the media 104, about a center of the media 104, at a constant or varying spindle speed 118. The spindle motor 116 is shown located at a center of the media 104 generates rotational forces, for example mechanical energy in the form of torque, to rotate the media at a point central to the media. The spindle speed 118 of the media 104 can be constant or varied, during read/write or non-read/write operations of the media, respectively.

It is understood that in various embodiments, the spindle motor 116 can also be used to indirectly drive or rotate the media 104 using mechanical coupling such as gears, pulleys, belts, or any combination thereof. Friction, pinch, or capstan drive for a linear magnetic tape strip or a rotating head of the tape drive, described above, can be directly or indirectly driven by the spindle motor 116.

In an embodiment, the spindle motor 116 is described as a Brushless Direct Current (BLDC) motor. It is understood that in other embodiments, the spindle motor 116 can be other motors such as an Alternating Current (AC) or Direct Current (DC) motor including a Brushed Direct Current (BDC) motor, as an example. It is also understood that the spindle motor 116 can include passive or active magnets, such as permanent magnets, actively driven electro-magnets, fixed position pole magnets, rotating pole magnets, rotating field magnets, or any combination thereof, as examples.

In the description below, a number of example components and/or modules of the control circuitry 114 are individually described. It is noted that not all components and/or modules are required or are present in the various embodiments. In some embodiments, the functions performed by the components and/or modules maybe performed by fewer components and/or modules, or omitted entirely. In one embodiment, a Spindle Motor Control Circuitry (SMCC) 122 of the control circuitry 114 controls, monitors, adjusts, and compensates signals to the spindle motor 116 based on intrinsic spindle motor conditions, extrinsic spindle motor conditions, and any combination thereof. The intrinsic spindle motor conditions are defined as changes in static or dynamic physical and mechanical attributes within the spindle motor 116 due to wear, pressure, humidity, heat, movement, variations between manufactured/built motor models or motor build lots of a specific model, or any combination thereof.

The static or dynamic physical and mechanical attributes within the spindle motor 116 can include electrical characteristics of any electrical wiring within the motor stator or armature, bearing lubrication friction characteristics, mechanical bearing, race, or sleeve interference tolerances, commutators/brush electromechanical characteristics, or any combination thereof that change due to wear, pressure, humidity, heat, movement, or variations between manufactured/built motor models or motor build lots of a specific model.

The extrinsic spindle motor conditions are defined in one embodiment as changes in static or dynamic motor loading characteristics or power characteristics due to variations in surrounding temperature, pressure, or humidity, inertia/interactions between movement the media 104 and the primary-actuator 108, internal air flow drag/buffeting of the media 104 from the head 102, mechanical friction, wear, or elastic/tension properties from a belt or band, or drag of any external mechanical coupling on the spindle motor 116, power supply noise/ripple to the spindle motor 116, or any combination thereof.

At power-up or start-up of the electronic system 100, the SMCC 122 in one embodiment starts the rotation of the spindle motor 116 using default signal settings and controlling sequences of voltage levels, current levels, and relative phase relationships of the voltage and current to bring the spindle motor 116 up to a running speed regulation phase of the spindle speed 118. For example, at start-up, increased current and voltage peaks can be applied to the spindle motor 116 to produce sufficient rotational torque needed to bring the media 104 and any other extrinsic loading from rest to rotation.

At the start-up, the SMCC 122 may begin monitoring the direction of rotation the media 104 to validate or re-adjust the phasing of the signals and sequences to the spindle motor 116 using a feedback loop. The feedback loop is defined as a connection path, from a first element to a second element controlling the first element, the connection path enables the second element to continuously monitor the first element and re-adjust, as needed, controls to the first element as changes are detected on the connection path.

For example, FIG. 1B is an embodiment showing an operational diagram of a Proportional Integral Derivative (PID) controller) 128 of the SMCC 122 controlling a Spindle Plant (SP) 132 with a Spindle Plant Feedback Loop (SPFL) 134 connecting the SP 132 back to the PID controller 128. The PID controller 128 is used as an example and can represent other loop controllers without limitations to one being Proportional Integral Derivative (PID) type. The SP 132 represents the spindle motor 116 and detected changes to the spindle motor 116 due to the extrinsic spindle motor conditions, the intrinsic spindle motor conditions, or any combination thereof.

The PID controller 128, the SP 132, the SPFL 134, and associated connections shown in FIG. 1B can be defined as a Spindle Motor Control Loop (SMCL) 138, shown within a dotted box in FIG. 1B, used to provide control of the rotational characteristics of the spindle motor 116 and the media 104, thus providing consistent data integrity, reliability, behavior, and performance for each rotating storage system, to minimize or eliminate variations introduced by different manufacturer sources or suppliers of the spindle motor 116.

Although the SMCL 138 is shown and described as having the PID controller 128, the SP 132, and the SPFL 134, it is understood that the SMCL 138 can include additional circuitry of the control circuitry 114. For example, in another embodiment, the SMCL 138 can include additional circuitry of the control circuitry 114 to provide the capability to automatically monitor, adjust, compensate, regulate, and control the spindle motor 116 of FIG. 1A, without any assistance from circuitry or firmware external to the SMCL 138.

In one embodiment, the SPFL 134 connection enables the PID controller 128 to continuously monitor the SP 132 and re-adjust the SP 132 based on changes detected from the SPFL 134, such as changes in the spindle motor 116 rotation or the spindle speed 118, as examples. The SPFL 134 can include signal information received from Hall Effect sensors within the spindle motor 116, simultaneously detected Back Electro Motive Force (BEMF) levels received from control signals being sent to the spindle motor 116 from the PID controller 128, or any combination thereof.

After the start-up has been initiated, the PID controller 128 in one embodiment checks for the spindle speed 118 of FIG. 1A to equal a minimum running speed, predetermined by the manufacturer of the rotating storage system and selected based on product objectives, for example.

In one embodiment, the PID controller 128 detects that the spindle speed 118 is greater than or equal to the minimum running speed, and is loaded with Optimized Loop Parameters (OLP) 142 as the spindle motor 116 reaches and locks to the spindle speed of a targeted Revolution Per Minute (RPM) speed. In one embodiment, the OLP 142 calibrate the SMCL 138 of the particular electronic system 100 to operate with a Target Loop Bandwidth (TLB) 144 with customized loop parameters based on torque constants, Kt, unique to each spindle motor installed in the system 100. To illustrate further, another electronic system 100' having a PID controller 128' and a spindle motor 116' with a different torque constant, Kt', may have different OLP generated for that configuration to achieve the TLB 144 at a specific targeted rotational speed.

Since the torque constant, Kt, can often be different between compatible replacement model/units of the spindle motor 116 at specific targeted rotational speeds, it is preferable that the TLBs of two systems having a compatible or comparable model of the spindle motor be similar or nearly identical to provide optimum and consistent read/write performance.

After the OLP 142 have been saved in the PID controller 128, the SMCL 138 in one embodiment is self-regulating and no longer needs any assistance from circuitry or firmware external to the SMCL 138. The PID controller 128 and the SPFL 138 can be externally interrupted and paused to vary the spindle speed 118, for example during non-read/write operational periods of the media, and resumed later for continued read/write operational periods of the media.

FIG. 1C is a flow diagram showing a process, according to one embodiment, executed by the control circuitry 114 of FIG. 1A to generate the OLP 142 customized and unique to the PID controller 128 and the SP 132.

In one embodiment, a compatible model of a spindle motor is defined as another spindle motor model having similar electrical and physical specifications such as number of stator or armature windings, number of magnetic poles, rated current, rated voltage, rated wattage, torque ratings, RPM ratings, Rated Life Hours (RLH), bearing system, shaft dimensions and mass, other specifications relevant to the electronic system 100, or any combination thereof.

It is understood that the default sequence with the default settings may or may not support sustained quality read/write operations due to electrical and mechanical variations that can exist between the SP 132 and the PID controller 128 of the SMCL 138. After a start-up of the electronic system 100, the spindle motor 116 has reached the minimum running speed using a default sequence with default settings.

In various embodiments, the control circuitry 114 screens the spindle motor 116 for proper or defective torque constants, Kt, of the spindle motor 116. Starting at Block 150, the control circuitry 114 injects a bandwidth test frequency (BTF) 146 into a BTF input of the SMCL 138. The BTF 146 value in one embodiment is based on the TLB 144 of the SMCL 138 and is a frequency adjacent to a frequency value of the TLB 144.

The PID controller 128 is targeted and tuned to operate at the TLB 144, control loop bandwidth, previously chosen and selected by the developers of the SMCL 138. The PID controller 128 is targeted and tuned to provide precise accuracy of the spindle speed 118, maximum control loop disturbance rejection, and for generating, if needed, the OLP 142. The OLP 142 can be customized to match a specific pairing of the PID controller 128 and a torque constant, Kt, associated with the spindle motor 116 at a selected nominal rotation speed, motor current, and critical control phasing for read/write operations to the media 104 of FIG. 1A.

Although the BTF input is depicted to feed an adder between the PID controller 128 and the SP 132, it is understood that the BTF input can feed into any location between the input of the SP 132 and the output of the SP 132. For example, the BTF input could be applied at the input of the PID controller 128. In another example, the BTF input could be feed into the SPFL 134.

Moving to Block 152 in FIG. 1C, the control circuitry 114 measures an Open Loop Gain (OLG) 154 of the SMCL 138. The OLG 154 is the resulting loop gain or loop compensation the PID controller 128 generated in response to the BTF 146 frequency disturbance injected into the SMCL 138. The OLG 154 can be measured once the control loop is idle, for example, the PID controller 128 has completed compensating for the BTL 146. Measurement of the OLG 154 can be performed at any point between the output of the PID controller 128 and input of the SP 132.

In Block 156, the control circuitry 114 calculates, using coordinate transformations, an Estimated Loop Bandwidth (ELB) 148 of the spindle motor control loop, based at least on one iteration of the BTF 146 injection and the OLG 154 measurement.

In an embodiment, a first BTF having a Frequency of B, Freq(B), in Hertz below the TLB 144 can be injected into the SMCL 138 and a first OLG corresponding to the first BTF is measured and recorded once the control loop is idle.

A second BTF having a Frequency of C, Freq(C), in Hertz above the TLB 144 can be injected into the SMCL 138 and a second OLG corresponding to the second BTF is measured and recorded once the control loop is idle. A magnitude difference between frequencies of the Freq(B) and the TLB 144 can be identical to a magnitude difference between frequencies of the Freq(C) and the TLB 144 to provide a fixed resolution calculation. In an embodiment, with the TLB 144 equal to 5 Hertz, the Freq(B) equal to 4.8 Hertz, and the Freq(C) equal to 5.2 Hertz, a loop calibration having a resolution of 0.2 Hertz centered at 5 Hertz can be evaluated, for example.

Figure 4A:
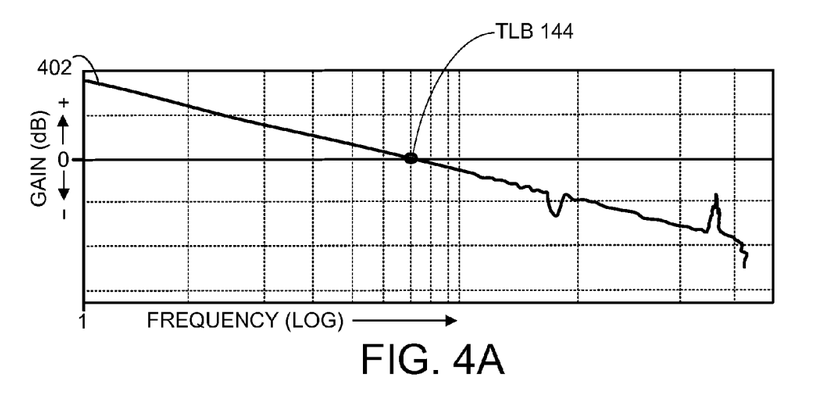
FIGS. 4A, 4B, and 4C, show a graphical example of coordinate transformation and linear interpolation formulation concepts used to estimate a loop bandwidth in various embodiments.
Figure 4B:
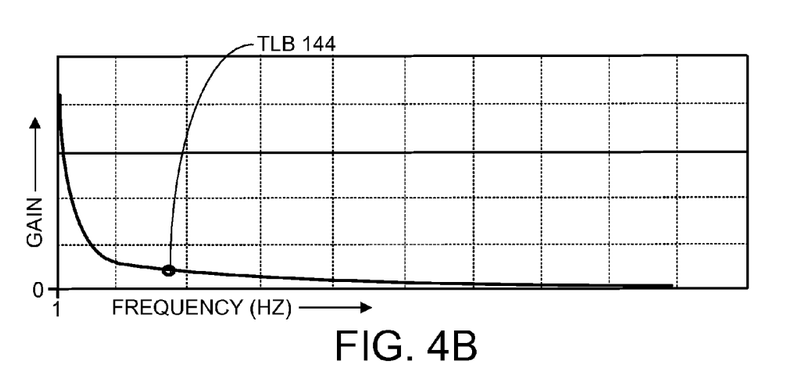
Figure 4C:
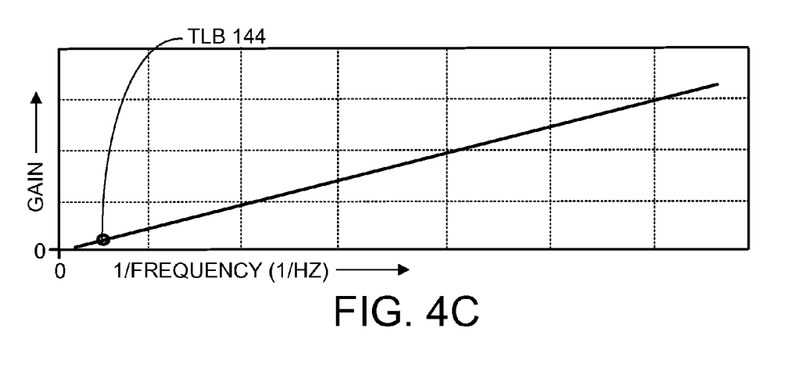

The measured parameters of the first OLG and the second OLG, corresponding to the first BTF and the second BTF, in conjunction with the Freq(B) and Freq(C) values, respectively, can be used by the control circuitry 114 to calculate the ELB 148 with an equation E1. The equation E1 can be derived using coordinate transformations, linear interpolation, or any combination thereof as described later in FIGS. 4A, 4B, and 4C, shown below.

$$\frac{OLGain(B) - OLGain(C)}{1/Freq(B) - 1/Freq(C)} = \frac{1 - OLGain(C)}{1/BW - 1/Freq(C)}; \quad \text{equation E1}$$

where OLGain(B) and OLGain(C) are the measured gains of the first OLG and the second OLG corresponding to the Freq(B) and Freq(C) inverted, respectively. The inverted value of the ELB 148 is represented by the inverted term BW, in the equation E1 above.

Values of the ELB 148 and the TLB 144 are compared to determine a scaling ratio (SR) 158. In one embodiment the SR is defined by the value of the TLB 144 divided by the value of the ELB 148. A magnitude of the SR 158 of 1 indicates how much the PID controller 128 idle control loop is out of tuned relative to the torque constant, Kt, of the spindle motor 116.

The control circuitry 114 can evaluate the magnitude of the SR 158 to determine if calibration of the control loop is not needed, needed, or not to be performed, indicating that the start-up default signal settings can be used by the PID controller 128, the OLP 142 be generated and used to calibrate the PID controller 128, or the spindle motor 116 be considered out of specification. A spindle motor that is out of specification, for example having an excessive Kt, may be rejected, or otherwise replaced by another spindle motor that can either be calibrated to or used as is with the default signal settings for the PID controller 128, respectively. A determination to reject or replace the spindle motor 116 based on the magnitude of the SR 158 is an fast and efficient method for screening out of a defective spindle motor compared to detection of gradual performance and reliability degradation over time for the user of the electronic system 100.

The acceptable range and the correctable range of the SR 158 can be predetermined and preset by the manufacturer of the electronic system 100 and can be based on product requirements and end user expectations such as product costs, reliability, availability, competitive analysis, targeted product market/class, or motor supply/demand, as examples.

In another embodiment, a single injection frequency, Freq (BC) inverted, equivalent to "1/Freq(B)–1/Freq(C)" in equation E1, generated from the Freq(C) inverted subtracted from the Freq(B) inverted, can be injected into the SMCL 138 of FIG. 1B. An OLGain(BC) value, equivalent to "OLGain(B)–OLGain(C)" in equation E1, can be measured once the control loop is at the idle state, and the OLGain(C) of the term "1−OLGain(C)" in equation E1 can be determined using coordinate transformations, linear interpolation, or any combination thereof as described later in FIGS. 4A, 4B, and 4C. The term 1/BW is determined using the Freq(BC), the OLGain(BC), the OLGain(C), and the equation E1. The TLB 144 and inverted value of the ELB 148, represented by the inverted term BW, can be used to calculate the SR 158.

In another embodiment, Freq(B) and Freq(C) can be simultaneously injected into the SMCL 138 of FIG. 1B. The OLGain(BC) value can be measured once the control loop is at the idle state, and the OLGain(C) of the term "1−OLGain (C)" in equation E1 can be determined using coordinate transformations, linear interpolation, or any combination thereof as described later in FIGS. 4A, 4B, and 4C. The term 1/BW is determined using the Freq(B), Freq(C), the OLGain(BC), the OLGain(C), and the equation E1. The TLB 144 and inverted value of the ELB 148, represented by the inverted term BW, can be used to calculate the SR 158.

Going back to FIG. 1C, in Block 162 the control circuitry 114 generates the OLP 142 of the SMCL 138. The SMCC 122 started the rotation of the spindle motor 116 using default signal settings and controlling sequences at the power-up or start-up of the electronic system 100. In an embodiment, for example, values of the OLP 142 can be generated by applying the SR 158 to default signal settings of the PID controller 128 using equations such as equation E2 and equation E3, shown below.

$$G_C(s) = (K_p + K_i/S + K_d \cdot s); \quad \text{equation E2}$$

$$Kp\_new = Kp\_old \times Param\_Ratio; \quad \text{equation E3}$$

Equation E2 is a time-invariant an open loop transfer function, Gc(s) of complex variables, s, with constants of Kp, Ki, and Kd corresponding to a proportional constant, integral polynomials in s, and derivative polynomials in s, respectively. Equation E3 can be used to calculate the OLP 142, represented as Kp_new, using the default signal settings and the SR 158, represented as Kp_old and Param_Ratio, respectively.

In an embodiment, the Kp_new value could also be used as a scale factor to proportionally adjust the Ki and Kd constants using a finite multiplier. In an embodiment, Ki can be calculated by multiplying Kp_new by a finite multiplier of 0.3 and Kd can be calculated by multiplying Kp_new by a finite multiplier (0.17, as an example).

Once the PID controller 128 control loop is calibrated properly with values of the OLP 142, the PID controller 128 and the spindle motor 116 of the SMCL 138 is considered optimized and calibrated for the life of the electronic system 100, or until the PID controller 128, the spindle motor 116, a mechanical component, an electrical component, or any combination thereof has been swapped or exchanged out of the electronic system 100.

The OLP 142 can be generated while the control loop is at idle and thus the OLP 142 are customized parameter settings that apply specifically to the PID controller 128 paired with the SP 132. The OLP 142 values are customized to each individual PID controller 128 and associated spindle motor. The optimized settings of the OLP 142 enable the control loop of the individual PID controller 128 to compensate for a torque constant, such as Kt, associated and unique to the associated spindle motor.

A control circuitry iteration cycle in one embodiment is defined as processes and activities shown and described in the Blocks 150-162. For example, 2 control circuitry iteration cycles is the completion of 1 iteration cycle in Blocks 150-162, followed by another iteration cycle in the Blocks 150-162.

It has been discovered in an embodiment that the OLP 142 are calibrated and optimized for the PID controller 128 and the spindle motor 116 within the SMCL 138 and converges to the OLP 142 within 2 control circuitry iteration cycles to provide minimal iteration and test cycles for each product, thus improving product throughput while reducing testing resources and cost.

It has been discovered in an embodiment that compensating for torque constants, Tk, and screening for out of specification Tk spindle motors results in the SMCL 138 of every electronic system 100 to behave and perform to specifications in an identical manner, irrespective of manufacturer, vendor, or source of the spindle motor 116 to provide market leadership in product costs, performance, reliability, and quality.

It has been discovered in an embodiment that the PID controller 128 with the OLP 142 calibrated and optimized for the spindle motor 116 enables a larger variety of motor suppliers to compete as a motor source to builders of the electronic system 100 resulting in the adaptability of, selection variety of, and substantial costs savings in the spindle motor 116.

It has been discovered in an embodiment that avoiding complex computations involving logarithmic expressions, by using coordinate transformations and linear interpolation formulas including linear polynomials of degree 0, provides a faster and simpler method of calibrating a PID controller and is less to prone to errors associated with complex computation methods.

It has been discovered in an embodiment that the OLP 142 ensure that the PID controller 128 provides the minimum current to maintain the desired rotational torque for the Kt of the spindle motor 116 resulting in lower motor operating temperatures and longer motor life by preventing demagnetization and flux field loss to permanent magnets of the spindle motor 116.

It has been discovered in an embodiment that injecting the BTF 146, measuring the OLG 154, calculating the ELB 148, and determining the magnitude of the SR 158 provides a simple, fast, and efficient method for screening out bad/defective spindle motor due to excessive torque constants, Kt, which otherwise be difficult to detect at the manufacturing plant, which is costly to the product users, thus eliminating difficult to diagnose read/write performance issues.

Figure 2:
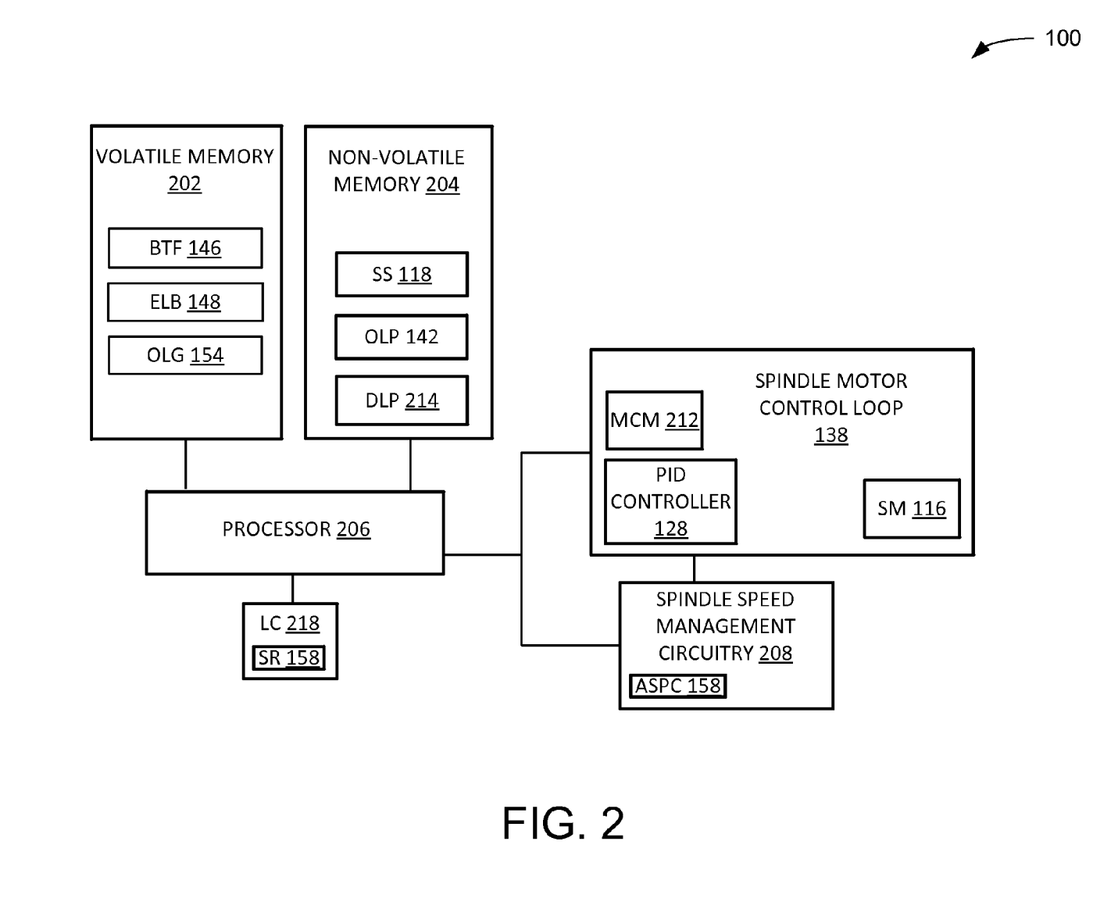
FIG. 2 shows shown functional blocks used to calibrate the PID controller control loop for motor torque and operate the SMCL according to various embodiments.

Referring now to FIG. 2, therein is shown functional blocks used to calibrate the PID controller 128 control loop for motor torque, Kt and operate the SMCL 138 according to various embodiments. The functional blocks include a volatile memory 202, a non-volatile memory 204, a processor 206, and spindle speed management circuitry (SSMC) 208 of the SPFL 134 of FIG. 1B.

It is understood that any combination of all or portions of the processor 206, the SSMC 208, or the SMCL 138 can be implemented as software, hardware, or any combination thereof. The software can be machine code, firmware, embedded code, application software, or any combination thereof.

The processor 206 can be used to load a Motor Control Memory (MCM) 212 with Default Loop Parameters (DLP) 214 and the spindle speed 118 to the minimum running speed stored in the non-volatile memory 204. The DLP 214 set the default signal settings for the PID controller 128 at start-up, and occasionally, at running speed when calibration of the control loop is not needed as described in FIG. 1C. The MCM 212, much smaller in storage capacity than the volatile memory 202 and the non-volatile memory 204, can include volatile memory, non-volatile memory, or any combination thereof.

In one embodiment, the processor 206 signals the PID controller 128 to start driving signals, coupled to the spindle motor (SM) 116, to rotate the SM 116 as the PID controller 128 processes the loop parameters stored in the MCM 212. The SSMC 208 converts, processes, and presents the information from the SM 116 as described in FIG. 1B. The SSMC 208 can include analog circuitry, digital circuitry, an Analog Signal Processor Controller (ASPC) 216, or any combination thereof. The ASPC 216 can convert analog motor control signals to digital signals, compute analog motor control signals relationships such as angular positions, power, or current/voltage phases, as examples, for processing and use by the PID controller 128, the processor 206, or any combination thereof.

In one embodiment, the processor 206 controls, monitors, and supervises the events described in FIG. 1C and generates the SR 158 of FIG. 1A, stored in a Local Cache (LC) 218 to determine: (1) if calibration of the SMCL 138 is necessary or (2) if the SM 116 is defected, for example, by having exceeded pre-determined torque constant, Kt, requirements. The LC 218 can high speed memory permitting fast read/write access of data to and from the processor 206.

The volatile memory 202 can be used to temporarily store/access information such as the BTF 146, the DLP 214, the ELB 148, the OLP 142, the OLG 154, or any other parameters needed by circuitry, software, user of the electronic system 100, or manufacturing of the electronic system 100. The non-volatile memory 204 can be used to retain, until modified/removed, the SS 118, the OLP 142, the DLP 214, and any other information needed similar or identical to the information in the volatile memory 202, such as during a power up speed regulation phase.

It is understood that the functional blocks or portions of the functional blocks can be integrated into the SMCL 138, within the control circuitry 114 of FIG. 1A external to the SMCL 138, external to the electronic system 100, or any combination thereof.

In an embodiment, for example, portions of the processor 206 performing the tasks described in FIG. 1C could be implemented, in hardware, software, or any combination thereof, external to the electronic system 100. In another embodiment, for example, portions of the processor 206 performing the tasks described in FIG. 1C could be implemented in the SMCL 138.

It has been discovered that implementing the volatile memory 202, the non-volatile memory 204, the processor 206, and the LC 218 external from the electronic system 100 enables the SMCL 138 and the SSMC 208 to have the smallest form factor while providing the lowest cost for the SMCL 138 and improved product reliability by having fewer components that could fail.

It has been discovered that implementing the volatile memory 202, the non-volatile memory 204, the processor 206, the SMCL 138, the SSMC 208, and the LC 218 within the electronic system 100 enables remote, out-of-factory, or in field recalibration of the SM 116, testing the torque constant, Kp, of the SM 116 for eminent failure due to intrinsic spindle motor conditions, extrinsic spindle motor conditions, or any combination thereof.

Figure 3:
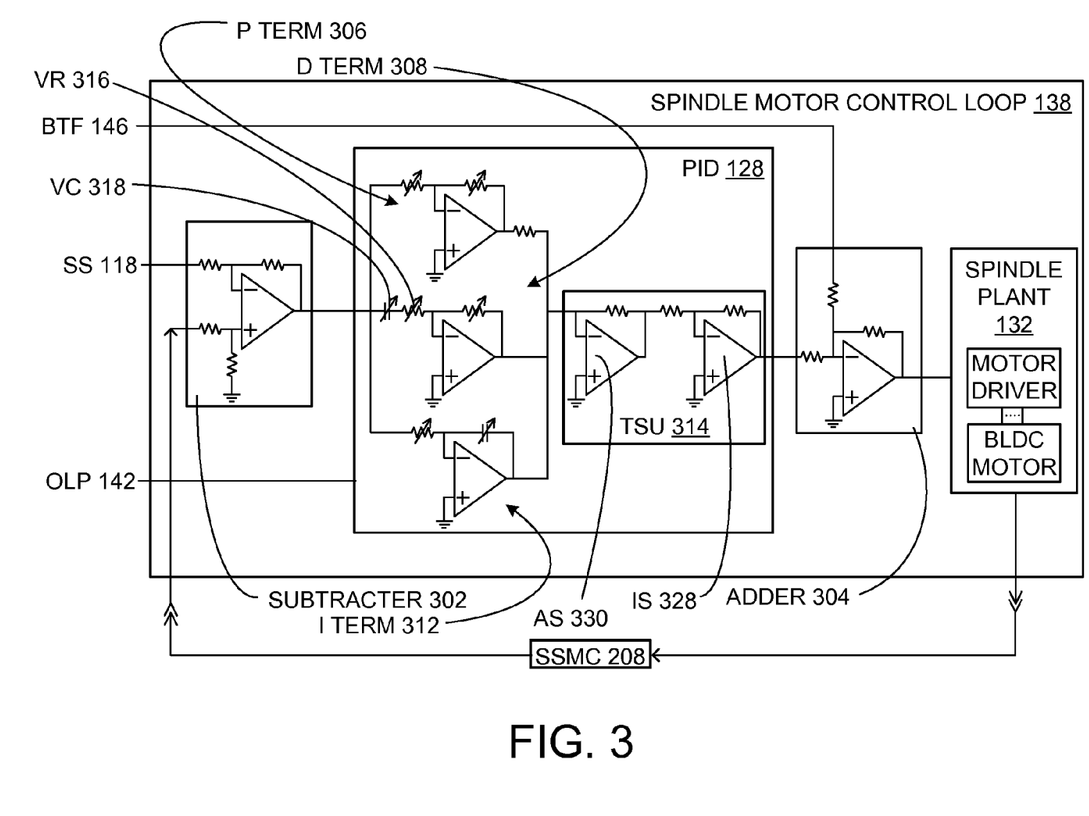
FIG. 3 shows a control loop circuitry of the SMCL according to an embodiment.

Referring now to FIG. 3, therein is shown an example implementation of the SMCL 138 according to an embodiment. FIG. 3 shows operational amplifiers (op_amps) used to construct a subtracter 302, functions within the PID controller 128, and an adder 304. Also shown in FIG. 3 is the SP 132. The functions constructed within the PID controller 128 using op_amps include a proportional term (P Term) 306, a derivative term (D Term) 308, an integral term (I Term) 312, and a True Summation Unit (TSU) 314.

The TSU 314 along with the constants Kp, Ki, and Kd of equation E2 influenced by the torque constant, Kt, described in the Block 162 of FIG. 1C, can provide a weighted sum of the P Term 306, the D Term 308, and the I term 312, represented as Gc(s) of equation E2 in the Block 162 description. In one embodiment, the OLP 142 of FIGS. 1A and 1B are the parameters, stored into the non-volatile memory 204 after created, and later copied from the non-volatile memory 204 to the volatile memory 202 when the spindle speed 118 has reached the running speed.

In one embodiment the OLP 142 is used to modify the constants by configuring variable passive devices that can include Variable Resisters (VR) 316 of the P Term 306, of the D Term 308, and of the I Term 312 and a Variable Capacitor (VC) 318 of the D Term 308 to calibrate the composite gain from outputs of the TSU 314. The variable passive devices of the PID controller 128 enable the SMCL 138 to regulate the spindle speed 118 and to minimize and control disturbance rejection based on the OLP 142.

Although FIG. 3 shows the adder 304 feeding the SP 132, it is understood that the output of the adder 304, such as a pulse modulated signal, can be coupled and to multiple motor drivers corresponding to 2 or more motor windings of a Brushless Direct Current (BLDC) motor with each of the windings having a different relative phase from one another to spin the BLDC motor.

The SP 132 drives an input of the SSMC 208 and an output of the SSMC 208 is sent to the subtracter 302 to provide feedback from Hall Effect sensors inside the BLDC motor of the SP 132. In another embodiment, the SP 132 can include the SM 116 of FIG. 1A without the Hall Effect sensors. The signals to the SM 116 could be snooped by the SSMC 208 and the BEMF component of the signals extracted and processed by the SSMC 208 can be sent to the subtracter 302 for processing, instead of feedback from Hall Effect sensors.

It has been discovered that the PID controller 128 with a control loop calibrated to torque constants, Kt, of spindle motors using the OLP 142 parameters generated by coordinate transformations and using linear interpolations can easily adapt to different spindle motors with or without Hall effect sensors to save costs and reduce development resources by providing a common SMCL architecture for different types of motors and product platforms.

Referring now to FIGS. 4A, 4B, and 4C, therein is shown a graphical example of coordinate transformation and linear interpolation formulation concepts used to estimate a loop bandwidth in various embodiments. In an embodiment, the ELB 148 of FIG. 1A is determined with coordinate transformations with linear interpolation of linear polynomials of degree 0. FIG. 4A shows a Bode plot of a transfer function a control loop of the SMCL 138.

The Bode plot has a vertical axis with logarithmic gain magnitude summations of the control loop, in decibels (dB), at specific frequencies relative to a reference gain of 0 db. The Bode plot has a horizontal axis with a logarithmic scale to plot frequencies, in Hertz. Each frequency on the horizontal axis corresponding to a logarithmic gain magnitude summation along the vertical axis. The Bode plot shows an open loop curve 402 indicating the gain frequency response of the control loop of the SMCL 138.

Observations of the graph 402 indicate the open loop curve 402 near the TLB 144 is linear and follow a slope close to −20 dB/decade. Also in practice, the PID controller 128 of FIG. 1B is designed to make the open loop curve 402 cross 0 dB with a slope around −20 dB/decade. Therefore, the open loop curve 402 can be described with as a linear equation, equation E4, as follows:

$$Y = k \cdot X - b;  \quad \text{equation E4}$$

Where $Y=20 \times \log(y)$ is the open loop gain in dB, $X = \log(x)$ is the frequency in log, $k \approx -20$ dB/decade is the slope, and $b$ is a constant value. Note that Y and X involve the log function which makes the implementation complex. Based on the assumption that the slope of the open loop curve 402 is around the TLB 144 near 0 dB and is close to −20 dB/decade, it can be deduced from the equation E4, above, the following equations E5A, E5B, and E5C (corresponding to the first/upper equation, the second/middle equation, and the third/last equation, respectively).

$$y = 10^{\left(\frac{k}{20}\log(x) + \frac{b}{20}\right)} \quad \text{equations E5A, E5B, and E5C}$$

-continued $$= 10^{\left(\frac{b}{20}\right)} \cdot x^{\left(\frac{k}{20}\right)}$$

$$= 10^{\left(\frac{b}{20}\right)} \cdot z^{\left(-\frac{k}{20}\right)} \text{ where } z = \frac{1}{x}$$

The third/last equation, equation E5C, generated a linear relationship between the open loop gain y and inverted frequency, $z=1/x$ in the new coordinates as shown FIGS. 4B and 4C. The TLB 144 area is enlarged by the coordinate transformation from the log-log plot of FIG. 4A to the linear-linear plots of FIGS. 4B and 4C, having a vertical axis of gain and a horizontal axis of frequency f and frequency inverted, 1/f, respectively.

Using the derived equation, equation E1, derived from equations E5A, E5B, and E5C and simple linear extrapolation of coordinates of a line formed by polynomials of degree 0 with a known slope, the ELB 148 can be calculated as described earlier for the Block 156 of FIG. 1C.

It has been discovered that the coordinate transformations and linear interpolation of linear polynomials of degree 0 eliminate the need for non-linear analysis such as with non-linear differential equations and limit cycle theory, Poincare maps, Lyapunov stability theorems, and other similar describing functions provides a fast, easy, methodology for estimating a loop bandwidth of any control loop feedback system near an open loop pole having −20 dB slope.

It has been discovered that coordinate transformations with linear interpolation of linear polynomials of degree 0 minimize or eliminate the need for logarithmic computations or complex linear mathematical analytical techniques such as Laplace transforms, Fourier transforms, Z transforms, Bode plots, root locus, Nyquist stability criterions, or any combination thereof. Furthermore, the coordinate transformations with linear interpolation of linear polynomials of degree 0 calculations provide for simpler calculations and faster solution convergences than non-linear and complex linear mathematical analytical methods.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In addition, any of the above described modules and components may be implemented in firmware, software, hardware, or any combination thereof.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and sub-combinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
a disk;
a spindle motor configured to rotate the disk; and
control circuitry, including a spindle motor control loop and coupled to the spindle motor, configured to:
inject a bandwidth test frequency into the spindle motor control loop,
measure an open loop gain of the spindle motor control loop,
calculate, using coordinate transformations, an estimated loop bandwidth of the spindle motor control loop based at least on one iteration of the bandwidth test frequency injection and the open loop gain measurement, and
generate optimum loop parameters of the spindle motor control loop.

2. The apparatus as claimed in claim 1 wherein the control circuitry is further configured to store the optimum loop parameters in a memory for calibration of and use by the spindle motor control loop.

3. The apparatus as claimed in claim 2 wherein the control circuitry is further configured to store the optimum loop parameters in a non-volatile memory.

4. The apparatus as claimed in claim 3 wherein the control circuitry is further configured to copy the optimum loop parameters to volatile memory from the non-volatile memory during a power up speed regulation phase.

5. The apparatus as claimed in claim 1 wherein the control circuitry is further configured to calculate the estimated loop bandwidth with a linear interpolation formula including linear polynomials of degree 0.

6. The apparatus as claimed in claim 1 wherein the control circuitry is further configured to screen the spindle motor for an out of specification motor torque constant defect.

7. The apparatus as claimed in claim 1 wherein the control circuitry is further configured to converge to the optimum loop parameters within two control circuitry iteration cycles.

8. The apparatus as claimed in claim 1 wherein control circuitry is further configured to dynamically configure a variable passive device of the spindle motor control loop to regulate spindle speed based on the optimum loop parameters.

9. The apparatus as claimed in claim 1 wherein control circuitry is further configured to dynamically configure a variable passive device of the spindle motor control loop to minimize and control disturbance rejection based on the optimum loop parameters.

10. The apparatus as claimed in claim 1 wherein the control circuitry is further configured to calculate the estimated loop bandwidth according to linear interpolation formula:

$$\frac{OLGain(B) - OLGain(C)}{1/Freq(B) - 1/Freq(C)} = \frac{1 - OLGain(C)}{1/BW - 1/Freq(C)}$$

wherein:
OLGain(B) represents a measured open loop gain at a frequency Point B corresponding to an injection bandwidth frequency evaluated in the format of 1/Freq(B) hertz;
OLGain(C) represents a measured open loop gain at a frequency Point C corresponding to another injection bandwidth frequency evaluated in the format of 1/Freq(C) hertz; and
1/BW represents the estimated loop bandwidth value inverted determined with linear interpolation.

11. A method of operating an apparatus, the method comprising:
injecting, with control circuitry, a bandwidth test frequency into a spindle motor control loop;
measuring an open loop gain of the spindle motor control loop;
calculating, using coordinate transformations, an estimated loop bandwidth of the spindle motor control loop based at least on one iteration of the bandwidth test frequency injection and the open loop gain measurement; and generating optimum loop parameters of the spindle motor control loop.

12. The method as claimed in claim 11 further comprising storing the optimum loop parameters in a memory for calibration of and use by the spindle motor control loop.

13. The method as claimed in claim 12 wherein storing the optimum loop parameters comprises storing the optimum loop parameters in a non-volatile memory.

14. The method as claimed in claim 13 further comprising copying the optimum loop parameters to a volatile memory from the non-volatile memory during a power up speed regulation phase.

15. The method as claimed in claim 13 wherein calculating the estimated loop bandwidth comprises calculating the estimated loop bandwidth with a linear interpolation formula having linear polynomials of degree 0.

16. The method as claimed in claim 13 further comprising screening a spindle motor having an out of specification motor torque constant defect.

17. The method as claimed in claim 13 wherein generating the optimum loop parameters further comprises converging to the optimum loop parameters within two control circuitry iteration cycles.

18. The method as claimed in claim 13 further comprising dynamically configuring a variable passive device of the spindle motor control loop to regulate spindle speed based on the optimum loop parameters.

19. The method as claimed in claim 13 further comprising dynamically configuring a variable passive device of the spindle motor control loop to minimize and control disturbance rejection based on the optimum loop parameters.

20. The method as claimed in claim 13 wherein calculating the estimated loop bandwidth comprises calculating the estimated loop bandwidth according to linear interpolation formula:

$$\frac{OLGain(B) - OLGain(C)}{1/Freq(B) - 1/Freq(C)} = \frac{1 - OLGain(C)}{1/BW - 1/Freq(C)}$$

wherein:
  OLGain(B) represents a measured open loop gain at a frequency Point B corresponding to an injection bandwidth frequency evaluated in the format of 1/Freq(B) hertz;
  OLGain(C) represents a measured open loop gain at a frequency Point C corresponding to another injection bandwidth frequency evaluated in the format of 1/Freq(C) hertz; and
  1/BW represents the estimated loop bandwidth value inverted determined with linear interpolation.

* * * * *